(12) United States Patent
Hollis et al.

(10) Patent No.: US 10,999,642 B1
(45) Date of Patent: May 4, 2021

(54) MULTI-VIDEO CAPTURE SYSTEM

(71) Applicant: Snap Inc., Santa Monica, CA (US)

(72) Inventors: Benjamin Ralph Hollis, Seattle, WA (US); William Alexander Strand, Sammamish, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/178,301

(22) Filed: Nov. 1, 2018

Related U.S. Application Data

(60) Provisional application No. 62/581,439, filed on Nov. 3, 2017.

(51) Int. Cl.
| | |
|---|---|
| *H04L 29/06* | (2006.01) |
| *H04N 21/4788* | (2011.01) |
| *H04N 5/272* | (2006.01) |
| *H04N 21/47* | (2011.01) |
| *H04N 21/431* | (2011.01) |

(52) U.S. Cl.
CPC ....... *H04N 21/4788* (2013.01); *H04L 65/601* (2013.01); *H04N 5/272* (2013.01); *H04N 21/4316* (2013.01); *H04N 21/47* (2013.01)

(58) Field of Classification Search
CPC .. H04L 65/601; H04N 5/272; H04N 5/44591; H04N 21/4788
See application file for complete search history.

(56) References Cited

U.S. PATENT DOCUMENTS

| | | | |
|---|---|---|---|
| 6,038,295 A | 3/2000 | Mattes | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |

(Continued)

FOREIGN PATENT DOCUMENTS

| | | |
|---|---|---|
| CA | 2887596 | 7/2015 |

OTHER PUBLICATIONS

"Skype Makes It Easy to Stay in Touch", Microsoft (Online), URL: https: www.skype.com en , (accessed Oct. 30, 2018), 3 pgs.

(Continued)

*Primary Examiner* — Gil H. Lee
*Assistant Examiner* — Juan C Turriate Gastulo
(74) *Attorney, Agent, or Firm* — Schwegman Lundberg & Woessner, P.A.

(57) ABSTRACT

Systems and methods provide for capturing, at a first computing device associated with a first user, a first video stream, and presenting, by the first computing device, and indication that a second computing device associated with a second user is located within a predetermined distance of the first computing device. The systems and methods further providing for receiving, by the first computing device, a request to access a second video stream being captured on the second computing device and displaying, by the first computing device, the second video stream being captured on the second computing device, on a display of the first computing device.

20 Claims, 12 Drawing Sheets

(56) References Cited

U.S. PATENT DOCUMENTS

| | | | |
|---|---|---|---|
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,584,834 B1 * | 2/2017 | Bush | H04N 21/266 |
| 2011/0202598 A1 | 8/2011 | Evans et al. | |
| 2011/0249073 A1 * | 10/2011 | Cranfill | G06F 9/451 |
| | | | 348/14.02 |
| 2012/0209924 A1 | 8/2012 | Evans et al. | |
| 2013/0235224 A1 | 9/2013 | Park | |
| 2014/0369660 A1 | 12/2014 | Lewis et al. | |
| 2016/0294894 A1 * | 10/2016 | Miller | G06F 16/24578 |
| 2018/0041552 A1 * | 2/2018 | Ormseth | H04L 65/1093 |
| 2018/0150465 A1 * | 5/2018 | Brownhill | H04L 67/18 |
| 2018/0152736 A1 * | 5/2018 | Alexander | H04N 21/41407 |
| 2019/0079941 A1 * | 3/2019 | Sarkar | G06Q 50/01 |

OTHER PUBLICATIONS

"Apple FaceTime for Mac", Apple Inc., Internet Archive WayBack Machine, URL: https: web.archive.org web 20160901171612 http: www.apple.com mac facetime , (Sep. 1, 2016), 4 pgs.

Leyden, John, "This SMS will self-destruct in 40 seconds", URL: http: www.theregister.co.uk 2005 12 12 stealthtext , (Dec. 12, 2005), 1 pg.

* cited by examiner ated on Nov. 3,
MULTI-VIDEO CAPTURE SYSTEM

This application claims the benefit of priority of U.S. Patent Application Ser. No. 62/581,439, filed on Nov. 3, 2017, which is hereby incorporated by reference herein in its entirety.

BACKGROUND

A messaging system may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to sharing media content items between devices (e.g., directly or via a messaging system). For example, a first user may be recording a video on a first device. A second user known to the first user (e.g., a friend, family member, colleague, acquaintance, member of the first user's social network, etc.) may be also capturing video on a second device in a location near the first user. Currently, there is no way to know that the second user is capturing video nearby or to view video the second user is currently capturing. In example embodiments, the first user may receive an indication on his device that the second user is nearby. The first user may request to view what the second user is capturing. The first device may display what the second user is capturing on a display on the first device. The display may show both video capture streams, the video the first user is capturing and the video the second user is capturing. In one example, the display may show a split screen with both videos. The first user may then indicate that he wishes to send a message with both videos to one or more other users. The first device may generate a message comprising both videos and send it to one or more other users or include it in one or more media collections. The one or more other users may receive the message comprising both videos and view the message with both videos on a display of a device. For example, the user receiving the message may view the message with the videos in split screen format.

Accordingly, example embodiments provide for collaborative video capture and a unique way of displaying multi-video capture and interacting with other users. Moreover, example embodiments allow for capture of video from different perspectives based on locations and angles of different devices. Furthermore, example embodiments allow for generating messages with combined videos from different devices/users and viewing combined videos from different devices/users.

Figure 1:
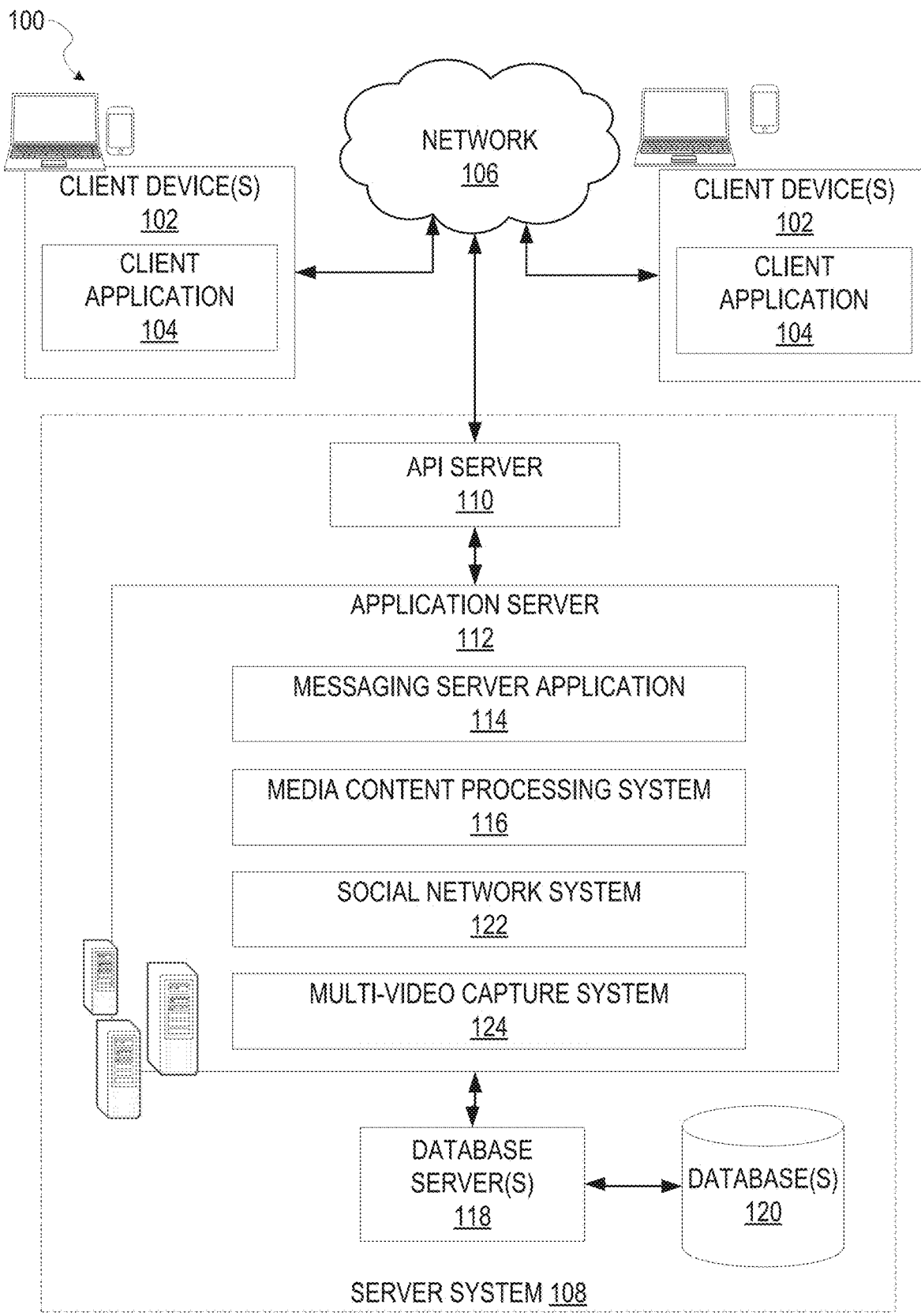
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. The networked system 100 includes multiple client devices 102, each of which hosts a number of client applications 104. Each client application 104 is communicatively coupled to other instances of the client application 104 and a server system 108 via a network 106.

The client device 102 may also be referred to herein as a user device or a user computing device. The client device 102 may comprise, but is not limited to, a mobile phone, desktop computer, laptop, portable digital assistant (PDA), smart phone, tablet, ultra-book, netbook, laptop, multi-processor system, microprocessor-based or programmable consumer electronic, game console, set-top box, computer in a vehicle, or any other communication device that a user may utilize to access the networked system 100. In some embodiments, the client device 102 may comprise a display module (not shown) to display information (e.g., in the form of user interfaces). In further embodiments, the client device 102 may comprise one or more of touch screens, accelerometers, gyroscopes, cameras, microphones, global positioning system (GPS) devices, and so forth. The client device 102 may be a device of a user that is used to create media content items such as video, images (e.g., photographs), audio, and send and receive messages containing such media content items to and from other users. Elements of such media content from multiple messages may then be displayed together as detailed further in the example embodiments described below. For example, the client device 102 may be a first device and may display a first video stream being captured on the first client device 102, and a second video stream that is being captured on a second client device 102. For example, the first client device 102 may display both the first video stream being captured by the first client device 102 and the second video stream being captured by the second client device 102, on a display screen of the first client device 102 (e.g., as a split screen or other means).

One or more users may interact with the client device 102 (e.g., a person, a machine, or other means of interacting with the client device 102). In example embodiments, the user may not be part of the system 100, but may interact with the system 100 via the client device 102 or other means. For instance, the user may provide input (e.g., touch screen input or alphanumeric input) to the client device 102 and the input may be communicated to other entities in the system 100 (e.g., server system 108, etc.) via the network 106. In this instance, the other entities in the system 100, in response to receiving the input from the user, may communicate information to the client device 102 via the network 106 to be presented to the user. In this way, the user may interact with the various entities in the system 100 using the client device 102.

The system 100 may further include a network 106. One or more portions of network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 102 may access the various data and applications provided by other entities in the system 100 via a web client (e.g., a browser, such as the Internet Explorer® browser developed by Microsoft® Corporation of Redmond, Wash. State) or one or more client applications 104. As described above, the client device 102 may include one or more client applications 104 (also referred to as "apps") such as, but not limited to, a web browser, messaging application, electronic mail (email) application, an e-commerce site application, a mapping or location application, media content editing application, media content viewing application, and the like.

In one example, a client application 104 may be a messaging application that allows a user to take a photograph or video, add a caption, or otherwise edit the photograph or video, and then send the photograph or video to another user. The message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or media collection. A gallery may be a collection of photos and videos which may be viewed by other users "following" the user's gallery (e.g., subscribed to view and receive updates in the user's gallery). The gallery may also be ephemeral (e.g., lasting 24 hours, lasting a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 104. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, to assemble photographs and videos from a recent vacation to share with friends and family.

In some embodiments, the one or more client applications 104 may be included in a given one of the client device 102, and configured to locally provide the user interface and at least some of the functionalities with the application 104 configured to communicate with other entities in the system 100 (e.g., server system 108), on an as needed basis, for data and/or processing capabilities not locally available (e.g., access location information, to authenticate a user, to verify a method of payment, access media content stored on a server, sync media content between the client device 102 and a server computer, etc.). Conversely, one or more applications 104 may not be included in the client device 102, and then the client device 102 may use its web browser to access the one or more applications hosted on other entities in the system 100 (e.g., server system 108).

A server system 108 may provide server-side functionality via the network 106 (e.g., the Internet or wide area network (WAN)) to one or more client devices 102. The server system 108 may include an application programming interface (API) server 110, an application server 112, a messaging server application 114, and a media content processing server 116, a social network system 122, and a multi-video capture system 124, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment. The one or more database(s) 120 may be storage devices that store information such as untreated media content, original media content from users (e.g., high quality media content), processed media content (e.g., media content that is formatted for sharing with client devices 102 and viewing on client devices 102), stitched audio data streams, user information, user device information, and so forth. The one or more database(s) 120 may include cloud-based storage external to the server system 108 (e.g., hosted by one or more third party entities external to the server system 108). While the storage devices are shown as database(s) 120, it is understood that the system 100 may access and store data in storage devices such as databases 120, blob storages, and other type of storage methods.

Accordingly, each client application 104 is able to communicate and exchange data with another client applications 104 and with the server system 108 via the network 106. The data exchanged between client applications 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the system 100 are described herein as being performed by either a client application 104 or by the server system 108, it will be appreciated that the location of certain functionality either within the client application 104 or the server system 108 is a design choice.

For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include message content, client device information, geolocation information, media annotation and overlays, message content persistence conditions, social network information, and live event information, date and time stamps, as examples. Data exchanges within the networked system 100 are invoked and controlled through functions available via user interfaces (UIs) of the client application 104.

In the server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 server receives and transmits message data (e.g., commands and message payloads) between the client device 102 and the application server 112. Specifically, the API server 110 provides a set of interfaces (e.g., routines and protocols) that can be called or queried by the client application 104 in order to invoke functionality of the application server 112. The API server 110 exposes various functions supported by the application server 112, including account registration, login functionality, the sending of messages, via the application server 112, from a particular client application 104 to another client application 104, the sending of media files (e.g., images or video) from a client application 104 to the messaging application server 114, and for possible access by another client application 104, the setting of a collection of media data (e.g., Story, gallery, media collection), the retrieval of a list of friends of a user of a client device 102, the retrieval of such collections, the retrieval of messages and content, the adding and deletion of friends to a social graph, the location of friends within a social graph, opening and application event (e.g., relating to the client application 104), detection and notification of user devices nearby a particular user device, and so forth.

The application server 112 hosts a number of applications and subsystems, including a messaging server application 114, a media content processing system 116, a social network system 122, and a multi-video capture system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or media collections). These collections are then made available, by the messaging server application 114, to the client application 104. Other processor and memory intensive processing of data may also be performed server-side by the messaging server application 114, in view of the hardware requirements for such processing.

The application server 112 also includes media content processing system 116 that is dedicated to performing various media content processing operations, typically with respect to images or video received within the payload of a message at the messaging server application 114. The media content processing system 116 may access one or more data storages (e.g., database(s) 120) to retrieve stored data to use in processing media content and to store results of processed media content.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the networked system 100 with which a particular user has relationships or is "following." and also the identification of other entities and interests of a particular user.

The application server 112 is communicatively coupled to a database server 118, which facilitates access to one or more database(s) 120 in which is stored data associated with messages processed by the messaging server application 114.

The messaging server application 114 may be responsible for generation and delivery of messages between users of client devices 102. The messaging application server 114 may utilize any one of a number of message delivery networks and platforms to deliver messages to users. For example, the messaging application server 114 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi Long Term Evolution (LTE), Bluetooth).

The multi-video system 124 may be responsible for detecting user devices nearby a particular user device, notification of the detected nearby device(s), generating a message comprising video received from a plurality of user computing devices (e.g., client devices 102), and so forth, as described in further detail below.

Figure 2:
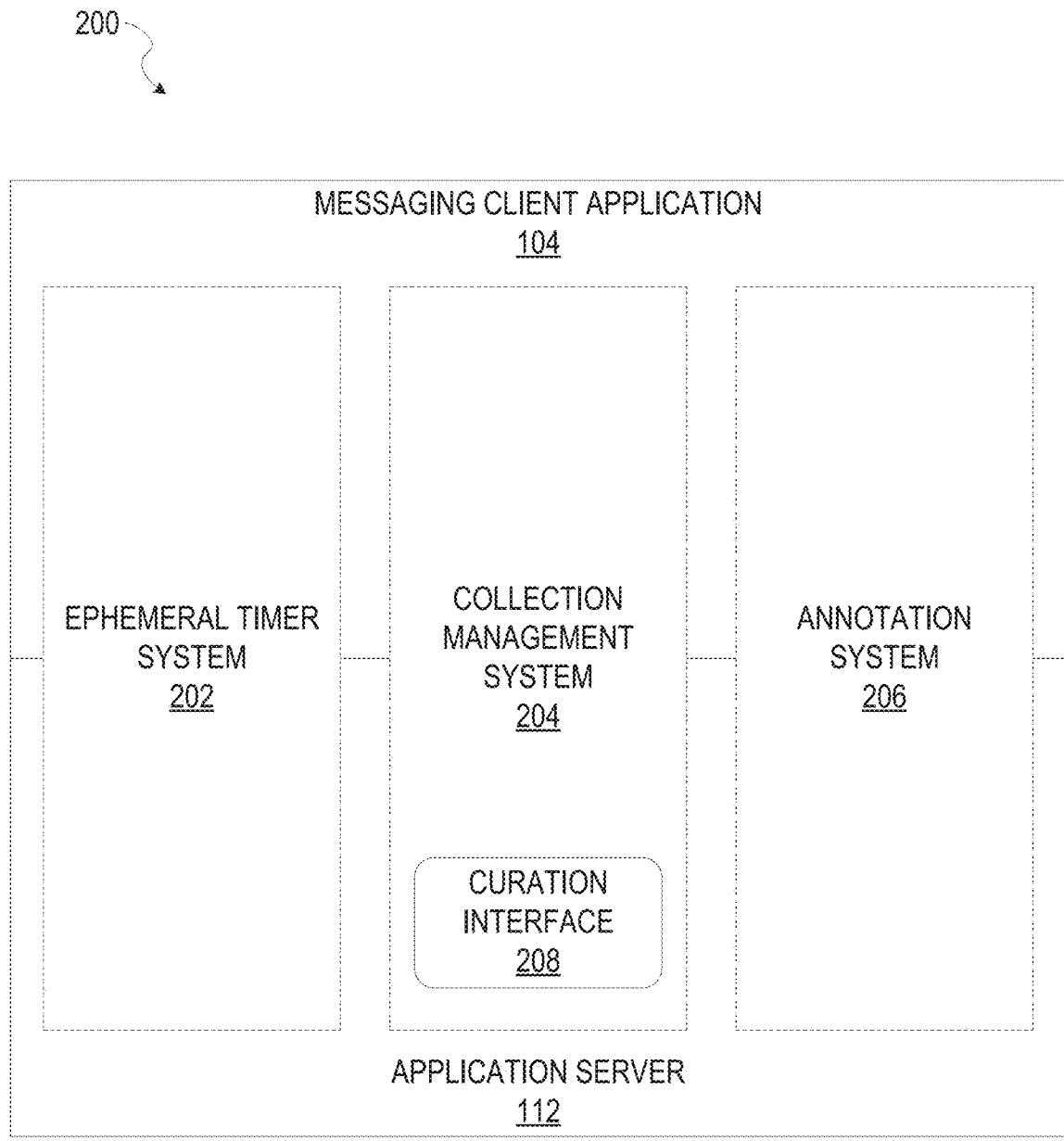
FIG. 2 is block diagram illustrating further details regarding a messaging system, according to some example embodiments.

FIG. 2 is block diagram illustrating further details regarding the system 100, according to example embodiments. Specifically, the system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story, gallery, media collection, etc.), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery," an "event story" or, a "media collection." Such a collection may be made available for a specified time period, such as the duration of an event to which the content relates. For example, content relating to a music concert may be made available as a "Story" for the duration of that music concert.

The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g. money, non-money credits or points associated with the communication system or a third party reward system, travel miles, access to artwork or specialized lenses, etcetera) may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

Figure 3:
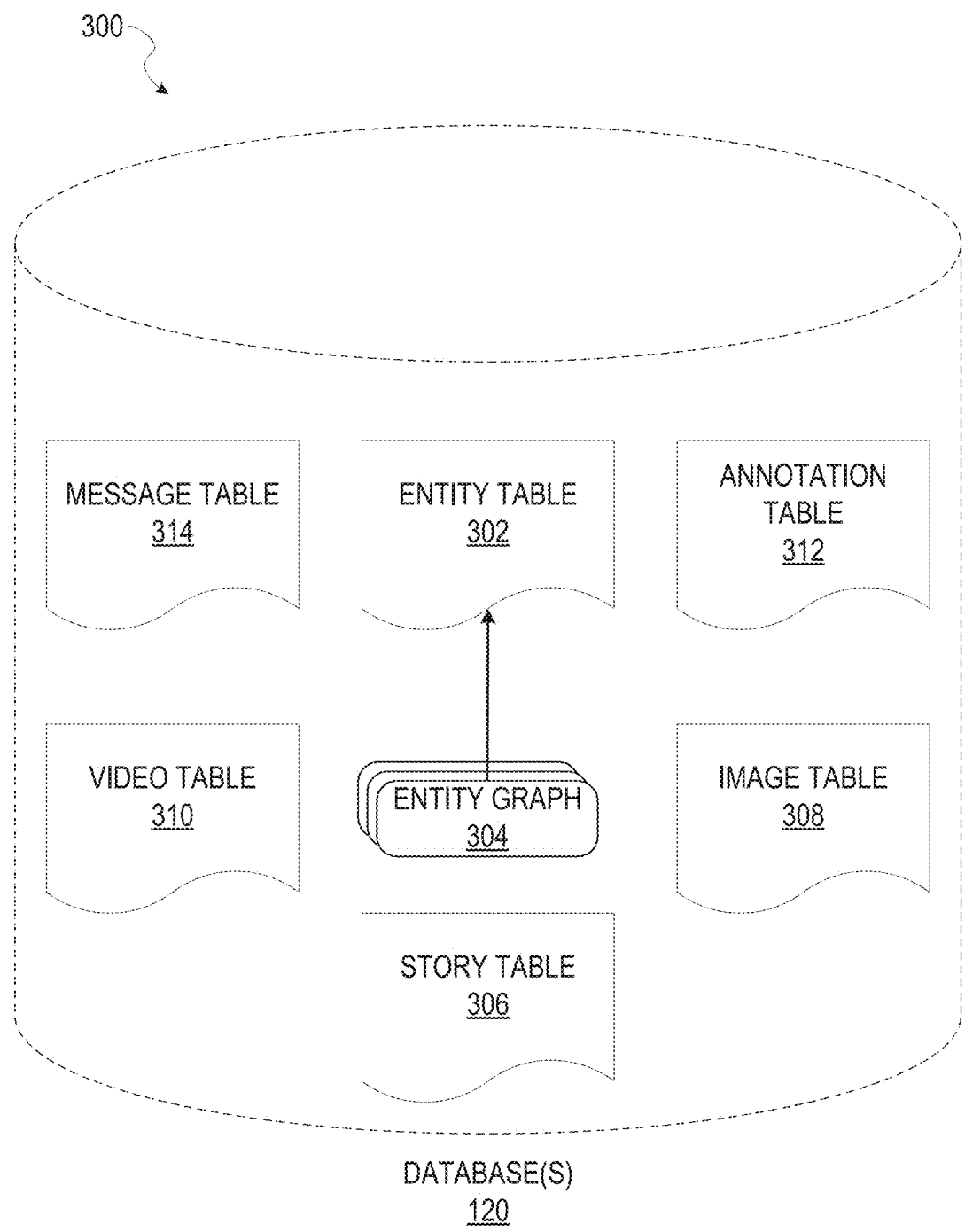
FIG. 3 is a schematic diagram illustrating data which may be stored in the database of the messaging server system, according to some example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data which may be stored in the database 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a story, gallery, or media collection). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story." which is a collection of content from multiple users that is created manually, automatically or using a combination of manual and automatic techniques. For example, a "live story" may constitute a curated stream of user-submitted content from varies locations and events. Users, whose client devices 102 have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
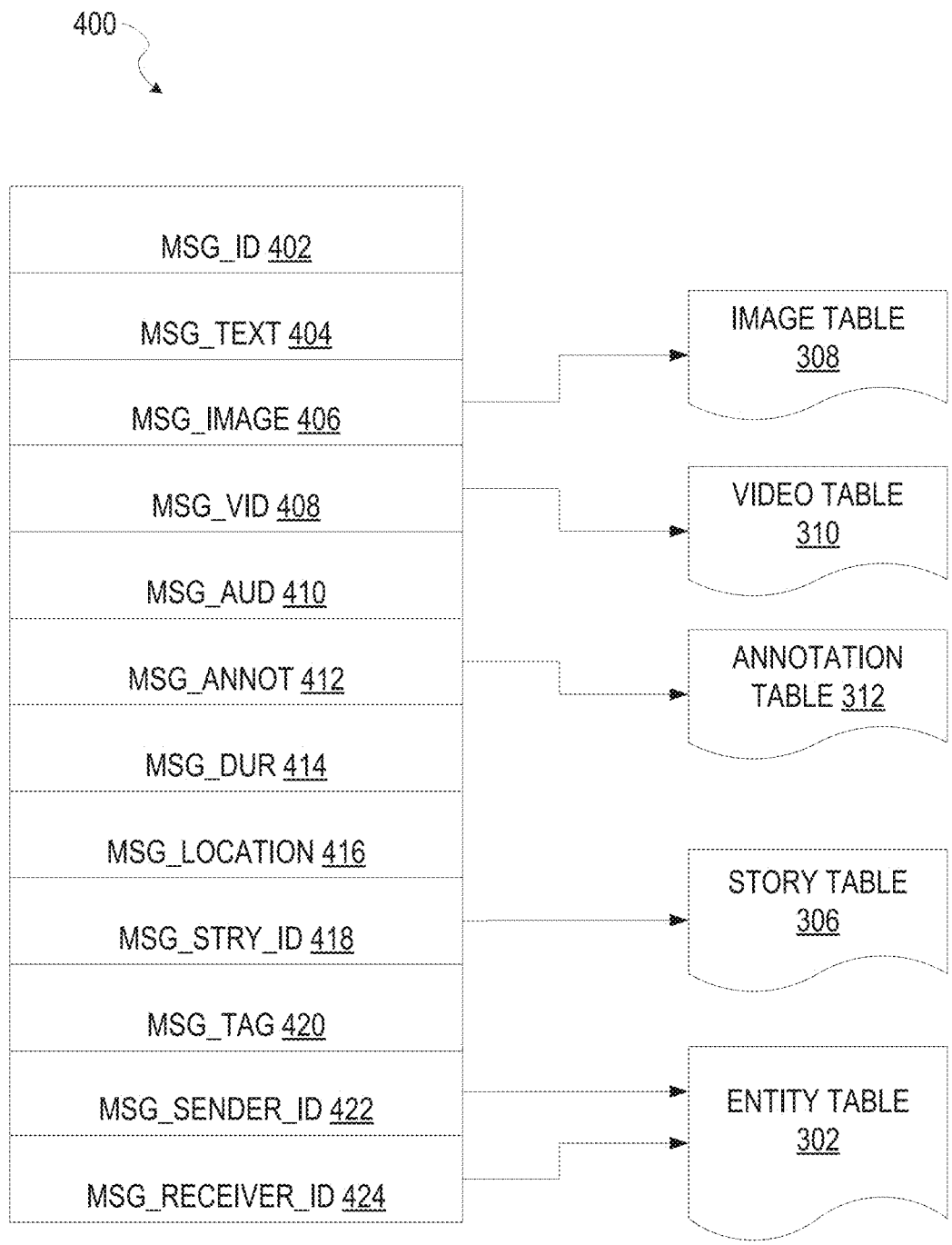
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a client application 104 for communication to a further client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.
A message text payload 404: text, to be generated by a user via a user interface of the client device 102 and that is included in the message 400.
A message image payload 406: image data, captured by a camera component of a client device 102 or retrieved from memory of a client device 102, and that is included in the message 400.
A message video payload 408: video data, captured by a camera component or retrieved from a memory component of the client device 102 and that is included in the message 400.
A message audio payload 410: audio data, captured by a microphone or retrieved from the memory component of the client device 102, and that is included in the message 400.
A message annotations 412: annotation data (e.g., filters, stickers or other enhancements) that represents annotations to be applied to message image payload 406, message video payload 408, or message audio payload 410 of the message 400.
A message duration parameter 414: parameter value indicating, in seconds, the amount of time for which content of the message 400 (e.g., the message image payload 406, message video payload 408, message audio payload 410) is to be presented or made accessible to a user via the messaging client application 104.
A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image into within the message image payload 406, or a specific video in the message video payload 408).
A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
A message sender identifier 422: an identifier (e.g., a messaging system identifier, email address or device identifier) indicative of a user of the client device 102 on which the message 400 was generated and from which the message 400 was sent
A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
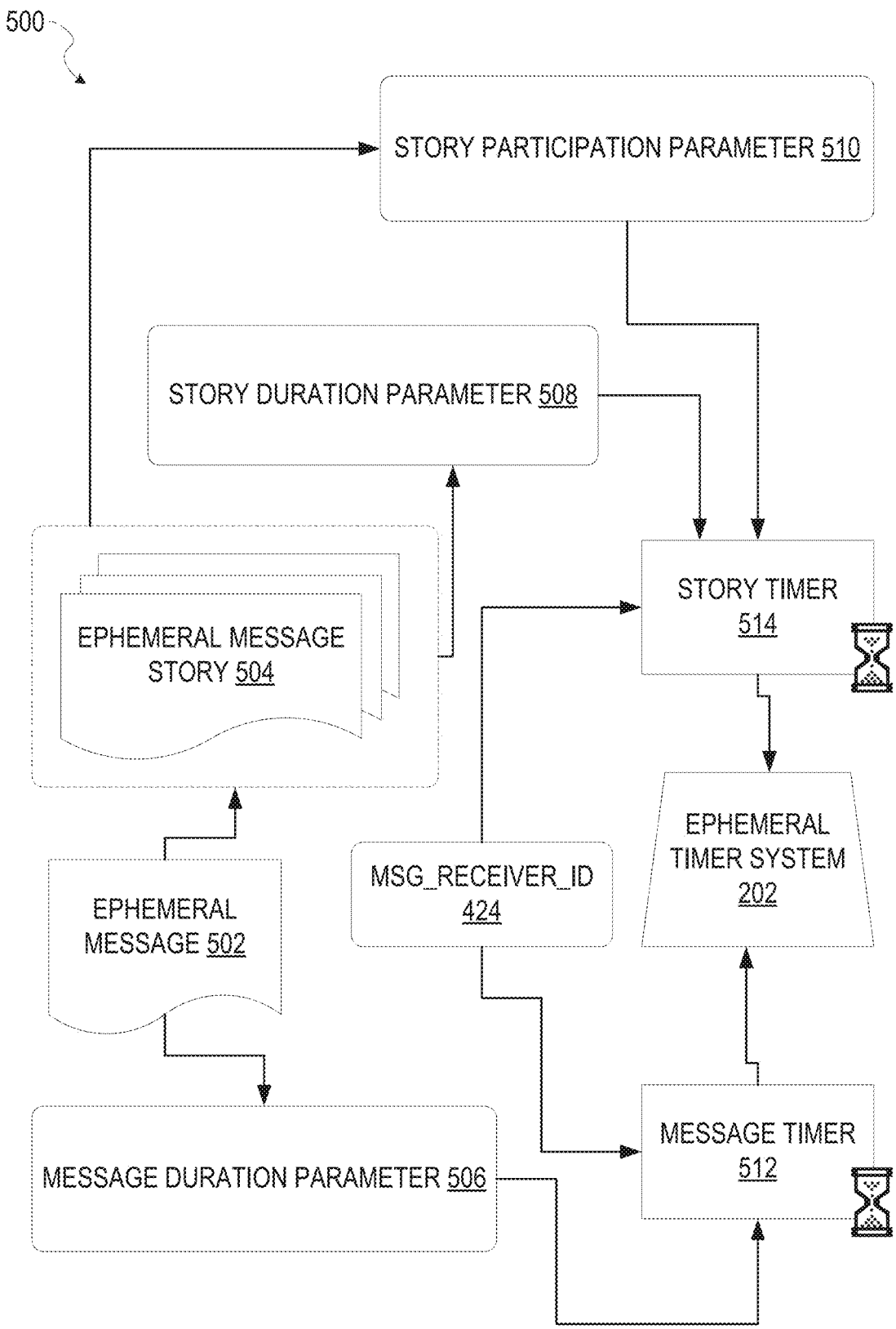
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the networked system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the system 100 (and, for example, specifically the messaging client application 104 to cause an indicium (e.g., an icon) associated with the relevant ephemeral message story 504 to no longer be displayed within a user interface of the client application 104. Similarly, when the ephemeral timer system 202 determines that the message duration parameter 506 for a particular ephemeral message 502 has expired, the ephemeral timer system 202 causes the client application 104 to no longer display an indicium (e.g., an icon or textual identification) associated with the ephemeral message 502.

Figure 6:
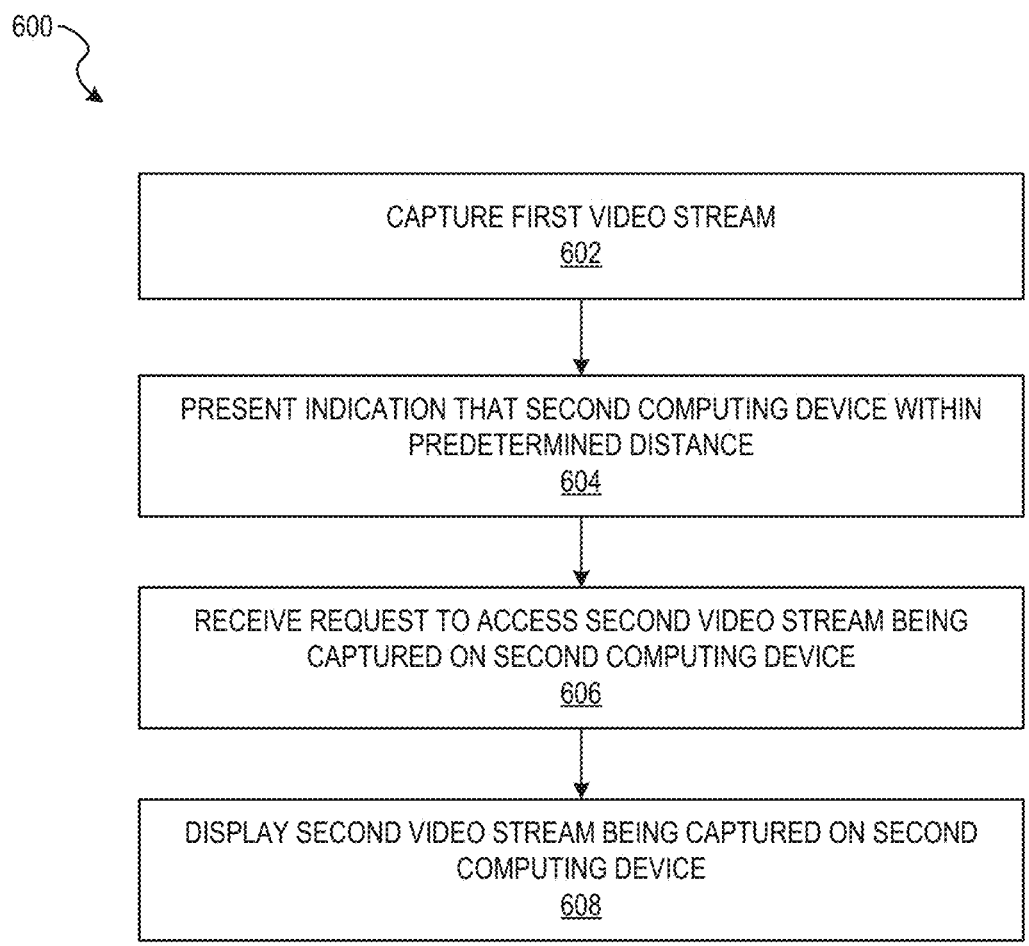
FIG. 6 is a flowchart illustrating aspects of a method, according to some example embodiments.

FIG. 6 is a flow chart illustrating aspects of a method 600, according to some example embodiments. In operation 602, a computing device (e.g., client device 102) captures a first video stream. For example, the computing device may be a first computing device associated with a first user. The first user may interact with a display or user interface on the first computing device to indicate a desire to capture a photograph or video. For example, the first user may press and hold on the display to capture video. The first computing device may detect the user interaction and start capturing a video stream via a camera device of the first computing device.

In operation 604, the first computing device presents an indication that a second computing device is nearby (e.g., within a predetermined distance from the first computing device). For example, the first computing device may detect when computing devices associated with other users (e.g., friends, family members, colleagues, acquaintances, members of the first user's social network, etc.) are nearby, such as within a predetermined distance from the first computing device (e.g., within a few feet, at a similar geolocation, within a half mile, within 5 miles, etc.). The first computing device may be able to detect the other computing device directly or may receive a notification from a server computing system (e.g., server system 108) that one or more other computing devices associated with the first user are within a predetermined distance.

In one example, the first computing device sends location data associated with the first computing device to a server system (e.g., server system 108, multi-video capture system 124, etc.). For example, the first computing device may comprise global positioning system (GPS) or other technology used to generate location data (e.g., coordinates, an address, a business or other location, etc.). The first computing device may send the location data periodically to the server system or specifically in a request for whether there are any nearby devices associated with users in the user's social network.

The server system receives the location data associated with the first computing device and uses the location data to determine a location of the first computing device and whether there are any other computing devices nearby (e.g., within a predetermined distance from the first computing device, as explained above) the location of the first computing device, based on location data the server system is receiving or has received from other computing devices associated with other users. The server system may determine whether any of users associated with the computing devices that are nearby the first computing device are within a social network of the user associated with the first computing device. For example, the server system may access a data source (e.g., social graph or entity graph 304) to determine if any of the users associated with the nearby computing devices are within the user's social network. If the server system determines that there are one or more devices nearby that are associated with users in the user's social network, it returns to the first computing device, data associated with the one or more devices and/or associated users. In one example, the server system may return information for only the nearest device/user or the device associated with the user that has the closest relationship to the user according to a social or entity graph or other means. The first computing device receives the information or data associated with the one or more devices and/or associated users.

Figure 7:
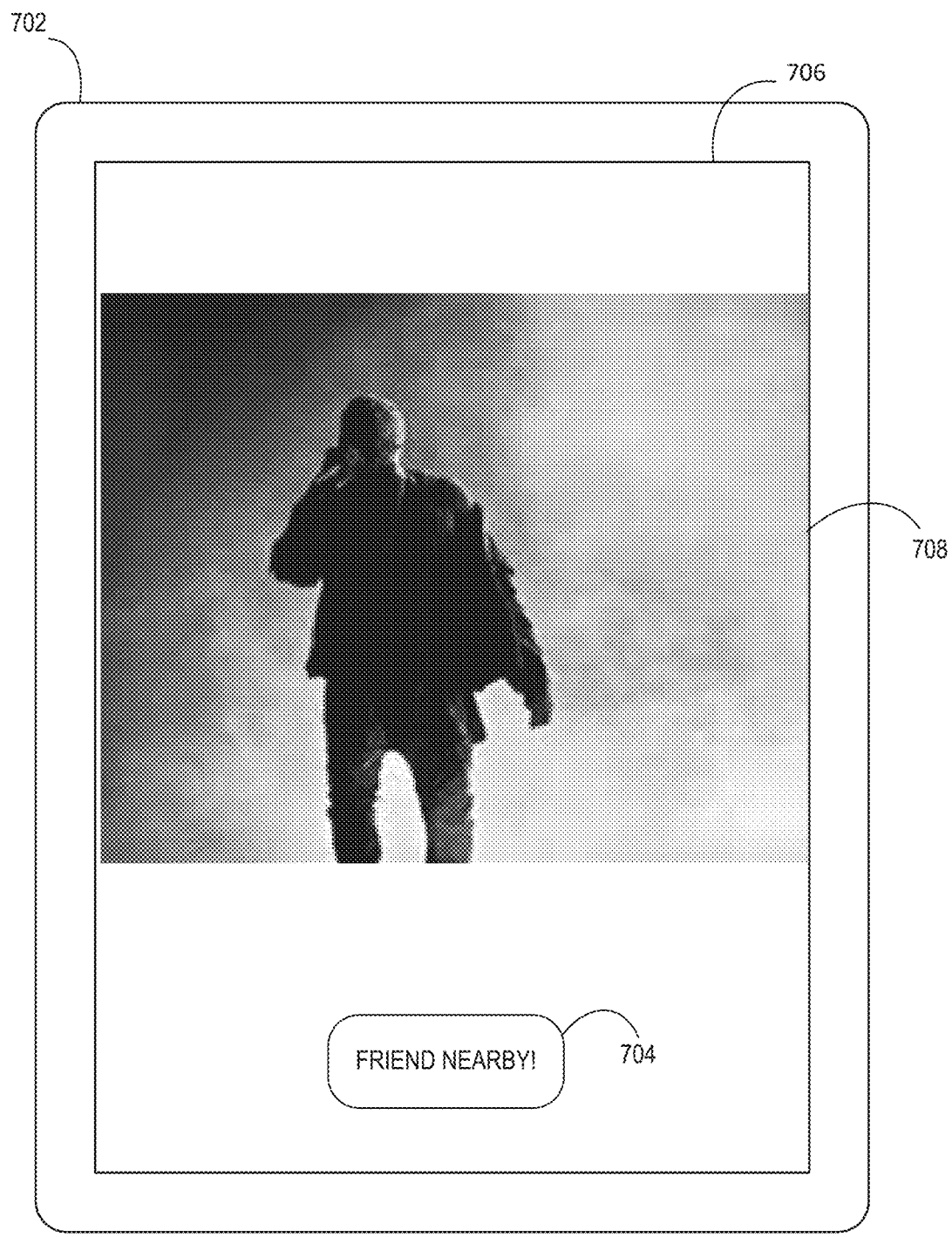
FIGS. 7-10 each show an example user interface of a computing device, according to some example embodiments.

The first computing device may present the indication that the second computing device is nearby, by providing a message or icon on the display of the first computing device. FIG. 7 shows an example user device 702 with a display 706 that shows a first video stream 708 being captured by the first computing device. FIG. 7 also shows an example of how an indication may be displayed to a user on the display 706. The indication may be an icon 704 that tells the user that a friend (or other user in the user's social network) is nearby. In this example, the icon 706 indicates that a friend is nearby. In other examples, the icon 706 could indicate that more than one friend is nearby.

The first computing device may receive a selection to view a list of the one or more users that are nearby and display a list of users nearby. In one example, the list includes only one user. In another example the list includes a plurality of nearby users. For example, the user may select the icon 704 and upon detection of the selection the computing device may display the user or users nearby. Each of the users in the list may also be selectable to display further information about each user, to send a message to the user, to display an option to view and/or capture video that the other user is currently capturing, and so forth.

Figure 8:
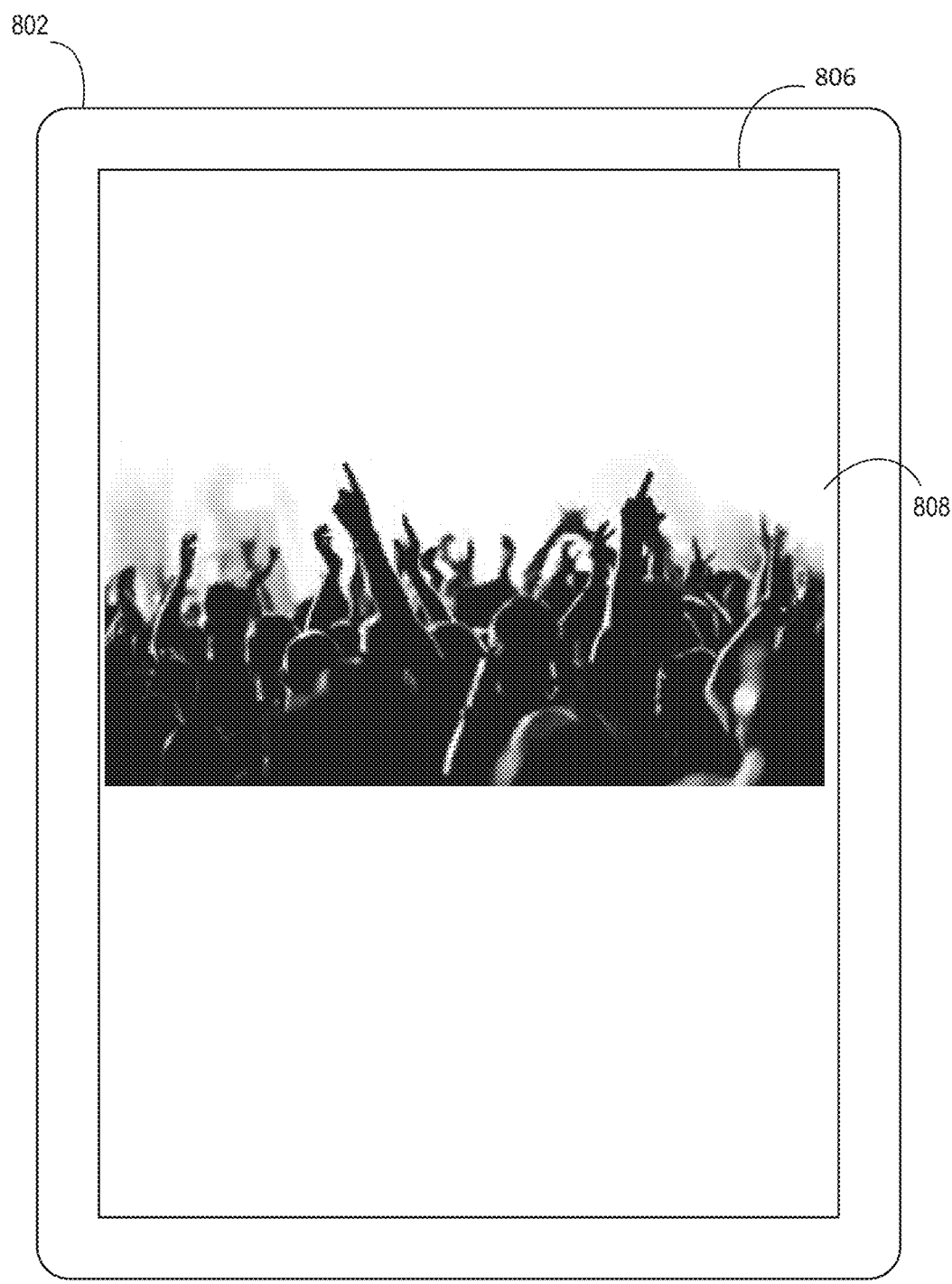

Returning to FIG. 6, in operation 606, the first computing device receives a request to access a second video stream being captured on the second computing device. For example, the first user may interact with the first computing device display or via buttons or other means to request access to the second video stream being captured on his friend's computing device. In one example, the first user may press or otherwise interaction with the icon 704 shown in FIG. 7 to request access to the second video stream. FIG. 8 shows an example second computing device 802 with a display 806 showing a second video stream 808 being captured by the second computing device associated with a second user.

In one example, the first computing device sends a message to the second computing device requesting access to the video being captured by the second computing device. In one example, the second computing device determines whether or not the first computing device is authorized to access the video being captured by the second computing device. For example, the second computing device determines whether the first user associated with the first computing device is within the second user's social network, may display a message to the second asking the second user whether or not the second user would like to grant access of the video being captured to the first user, or the like. Once the second computing device determines that the first computing device is authorized to access the video being captured by the second computing device, the second computing device may send the video stream being captured to the first computing device.

The video stream may be sent from the second computing device and received by the first computing device via any video streaming technology. For example, a WIFI direct connection may be established between the first computing device and the second computing device and the video may be streamed via the WIFI direction connection. In another example, the video may be streamed via a backend server system (e.g., server system 108). For example, the second computing device may send the video stream to the backend server and the backend server may send the video stream to the first computing device. Other forms of video streaming and connections may be used in other embodiments.

Figure 9:
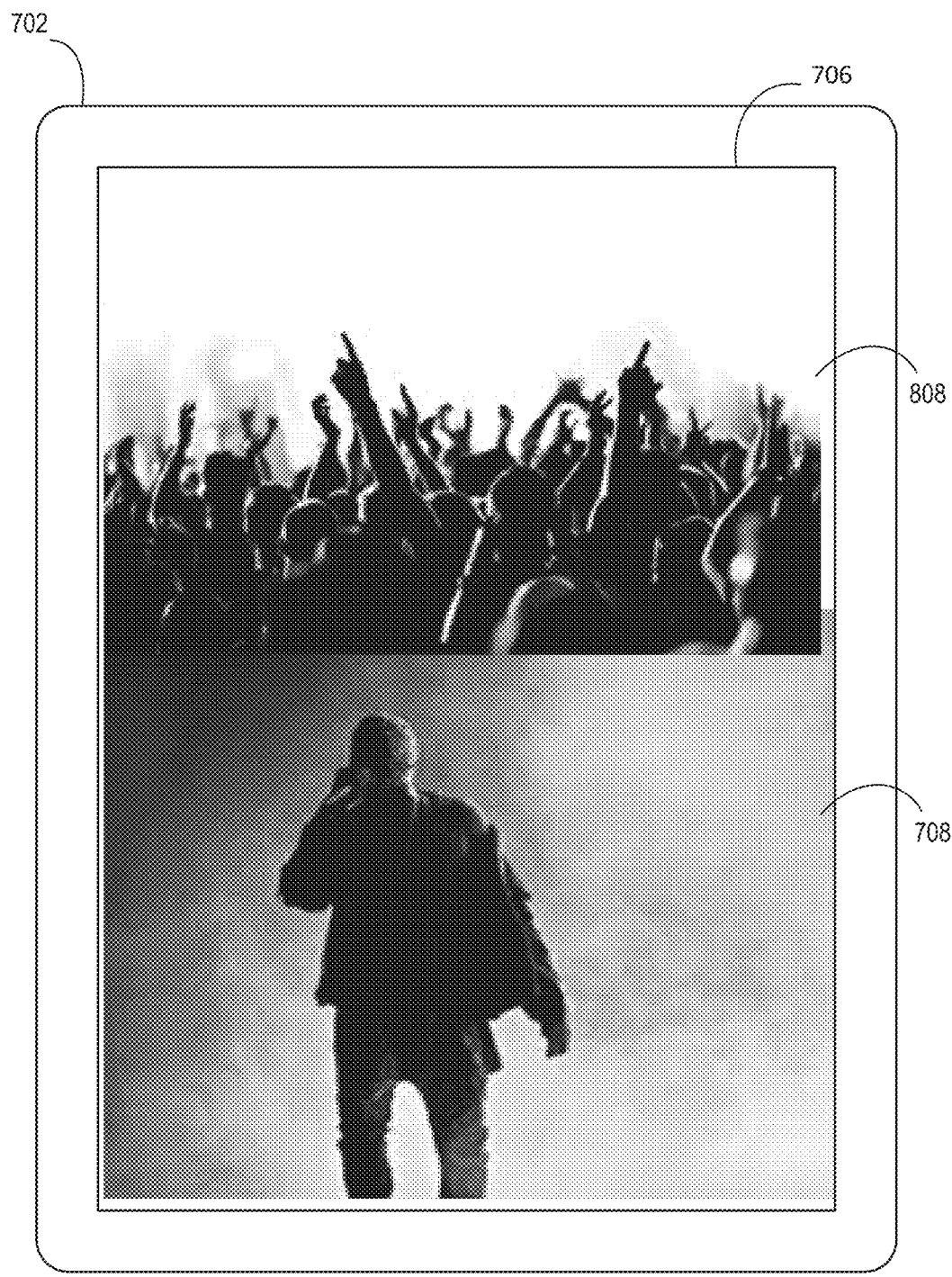

In operation 608 of FIG. 6, the first computing device displays the second video stream being captured on the second computing device on the display of the first computing device (e.g., in response to the request to access the second video stream). In one example, the first computing device may display both the first video stream being captured by the first computing device, and the second video stream being captured by the second computing device. FIG. 9 shows the first computing device 706 displaying the first video stream 708 and the second video stream 808, at the same time on the display 706 (e.g., via a split screen format). This is just one example of how the first video steam and second video stream may be displayed, other methods of displaying the first video stream and second video stream may be used in example embodiments.

In one example, the computing device provides user controls in the display that allow a user to adjust the way the two videos are displayed. For example, the display may include a slider between the two videos that allows a user to adjust the size of the videos so that one is smaller than the other (e.g., one vide taking up a third of the display and one video taking up two-thirds of the display, etc.), so that the two videos are equal size in the screen, and so forth. In one example, the computing device automatically adjusts the display based on the orientation of the computing device. For example, if the computing device is in a vertical orientation the videos may appear one on top of each other (e.g., as shown in FIG. 9) and if the computing device is in a horizontal orientation, the videos may appear side by side.

In one example, the first computing device captures both videos as they are being displayed on the computing device. Alternatively, the videos may be captured on a backend server. In another example, the videos may be displayed in a lower quality locally on the computing device (e.g., depending upon the computing device computing resources and abilities) to conserve resources but then also be captured in a higher quality format on the backend server. In this way if the user wants to view the two videos later on a device with better computing resources, the videos can be provided in higher quality. The video stream captured may comprise metadata with additional information such as instructions to combine a first video with a second video, a user identifier associated with the video, a media item identifier for the video, a computing device identifier that captured the video, a time stamp for capture of the video, and so forth.

In one example, each video can be controlled separately. For example, a first video can be paused or stopped while the second video continues recording.

Figure 10:
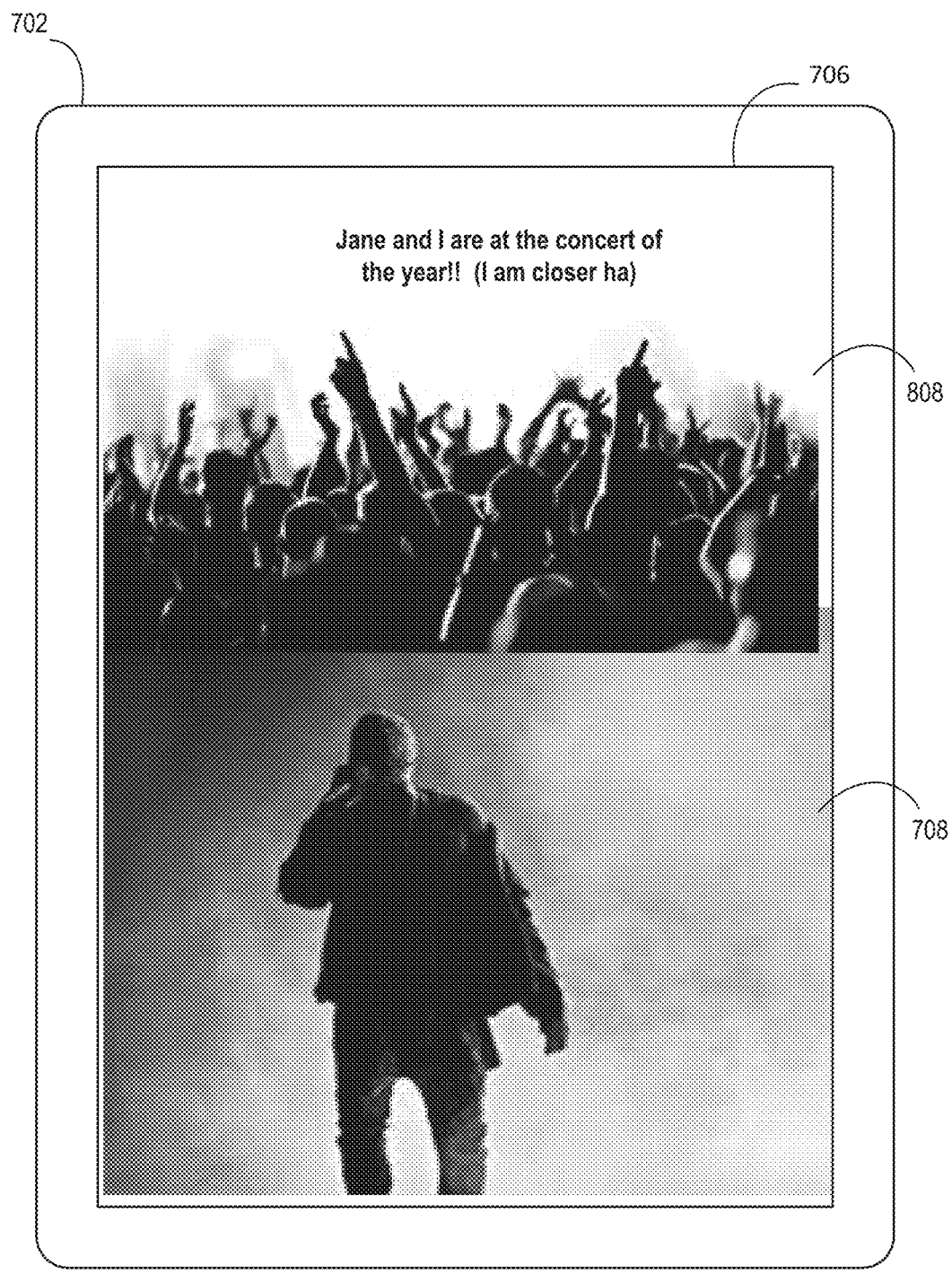

Example embodiments may further provide for a user to send a message comprising the at least a portion of the first video stream and at least a portion of the second video stream, to one or more other users. For example, the first computing device receives an indication (e.g., request) from the first user to send a message with a portion of the first video stream and at least a portion of the second video stream to a third device associated with a third user. The first user may want to add text, a media overlay, or other augmentation to the message, as described above. The first computing device generates a message comprising the at least one portion of the first video stream and the at least one portion of the second video stream (and any added text, media overlay, etc.). FIG. 10 shows an example message comprising the at least one portion of the first video stream and the at least one portion of the second video stream and text input by the first user. The first computing device sends the generated message to the third computing device. The third computing device receives the generated message via a third computing device and displays the two video streams on the third computing device. The two video streams may be displayed in a split screen or other format, as explained above. In one example, the message is an ephemeral message that is accessible for a time-limited duration, as explained above.

In one example, each video in the message can be controlled separately, as described above. For example, a first video can be paused or stopped while the second video continues recording.

Example embodiments may further provide for a user to add the at least one portion of the first video stream and at least one portion of the second video stream, to a media collection. For example, the first computing device may receive an indication (e.g., request) from the first user to add at least one portion of the first video stream and at least one portion of the second video stream to a media collection. In one example, the first computing device may then add the at least one portion of the first video and the at least one portion of the video stream to the media collection.

In one example, the first user may want to add text, a media overlay, or other augmentation to the message, as described above. The first computing device generates a message or media content item comprising the at least one portion of the first video stream and the at least one portion of the second video stream (and optionally any added text, media overlay, etc.). FIG. 10 shows an example message comprising the at least one portion of the first video stream and the at least one portion of the second video stream and text input by the first user. The first computing device may add the generated message to the media collection. One or more other users may access the media collection to view the message. For example, a third user may view the generated message via a third computing device and view the two video streams on the third computing device.

In one example, the third computing device adds the at least one portion of the first video stream and at least one portion of the second video stream to a media collection by sending the at least one portion of the first video stream and at least one portion of the second video stream to a server system (e.g., server system 108) to be added to the media collection. In another example, the third computing device adds the message or media content item comprising the at least one portion of the first video stream and at least one portion of the second video stream (and any text, media overlay, etc.) to a media collection by sending the message or media content item to a server computer to be added to the media collection. In another example the message or media content item is generated by the server computer and then added by the server computer to the media collection.

Example embodiments describe many operations and functionality performed by a computing device, such as a client device 102. The described operations and functionality may also be performed by one or more server computers (e.g., the multi-video capture system 124 in server system 108). In other examples, the operations and functionality may be performed by a combination of one or more client devices 102 and server system 108.

Figure 11:
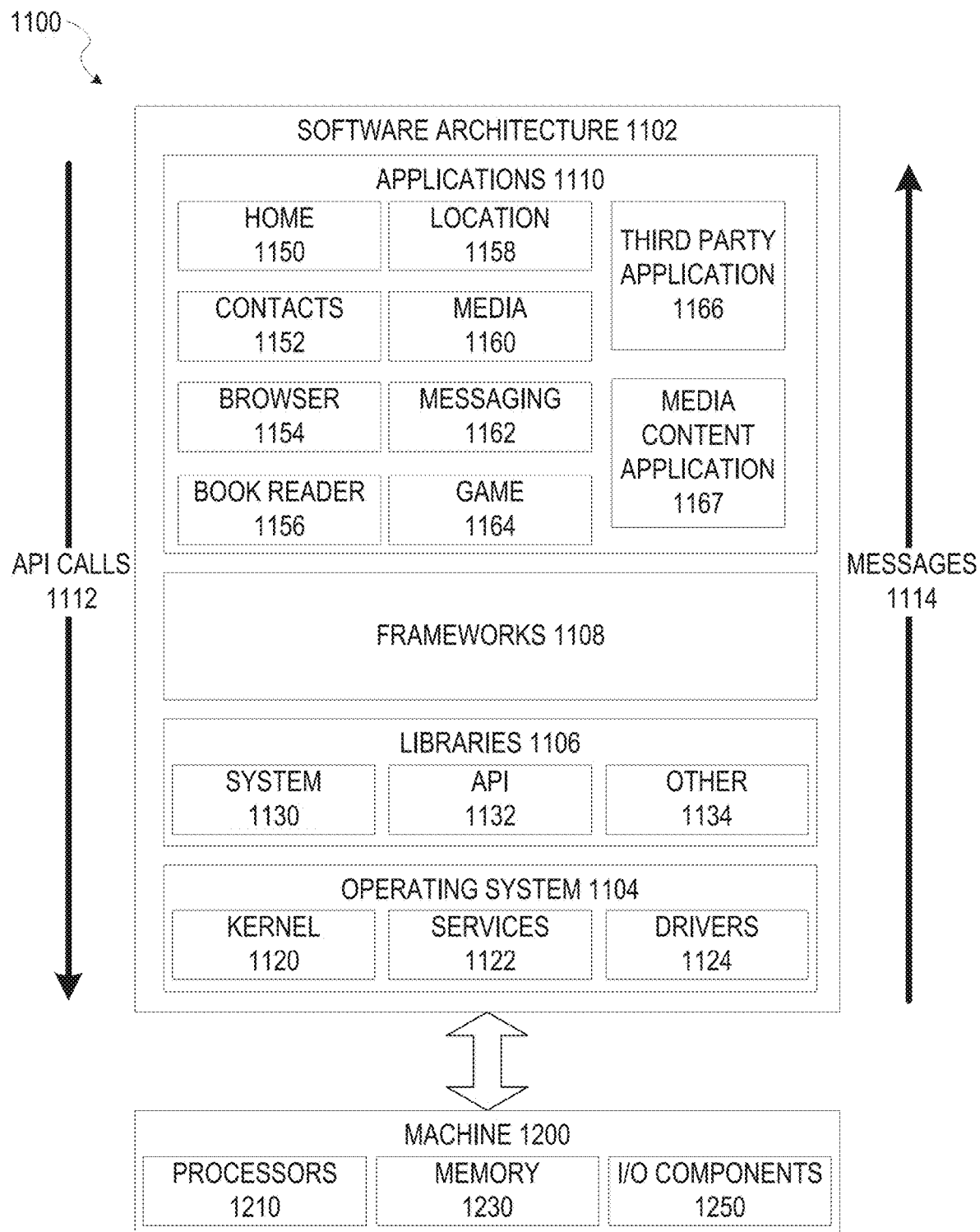
FIG. 11 is a block diagram illustrating an example of a software architecture that may be installed on a machine, according to some example embodiments.

FIG. 11 is a block diagram 1100 illustrating software architecture 1102, which can be installed on any one or more of the devices described above. For example, in various embodiments, client devices 102 and server systems 108, including server systems 110, 112, 114, 116, 118, 122, and 124 may be implemented using some or all of the elements of software architecture 1102. FIG. 11 is merely a non-limiting example of a software architecture, and it will be appreciated that many other architectures can be implemented to facilitate the functionality described herein. In various embodiments, the software architecture 1102 is implemented by hardware such as machine 1200 of FIG. 12 that includes processors 1210, memory 1230, and I/O components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications

1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party applications 1166 and media content application 1167. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1166 can invoke the API calls 1112 provided by the operating system 1104 to facilitate functionality described herein.

As explained above, some embodiments may particularly include a messaging application 1162. In certain embodiments, this may be a stand-alone application that operates to manage communications with a server system such as server system 108. In other embodiments, this functionality may be integrated with another application such as a media content viewing application 1167. Messaging application 1162 may request and display various media content items and may provide the capability for a user to input data related to media content items via a touch interface, keyboard, or using a camera device of machine 1200, communication with a server system 108 via I/O components 1250, and receipt and storage of media content items in memory 1230. Presentation of media content items and user inputs associated with media content items may be managed by messaging application 1162 using different frameworks 1108, library 1106 elements, or operating system 1104 elements operating on a machine 1200.

Figure 12:
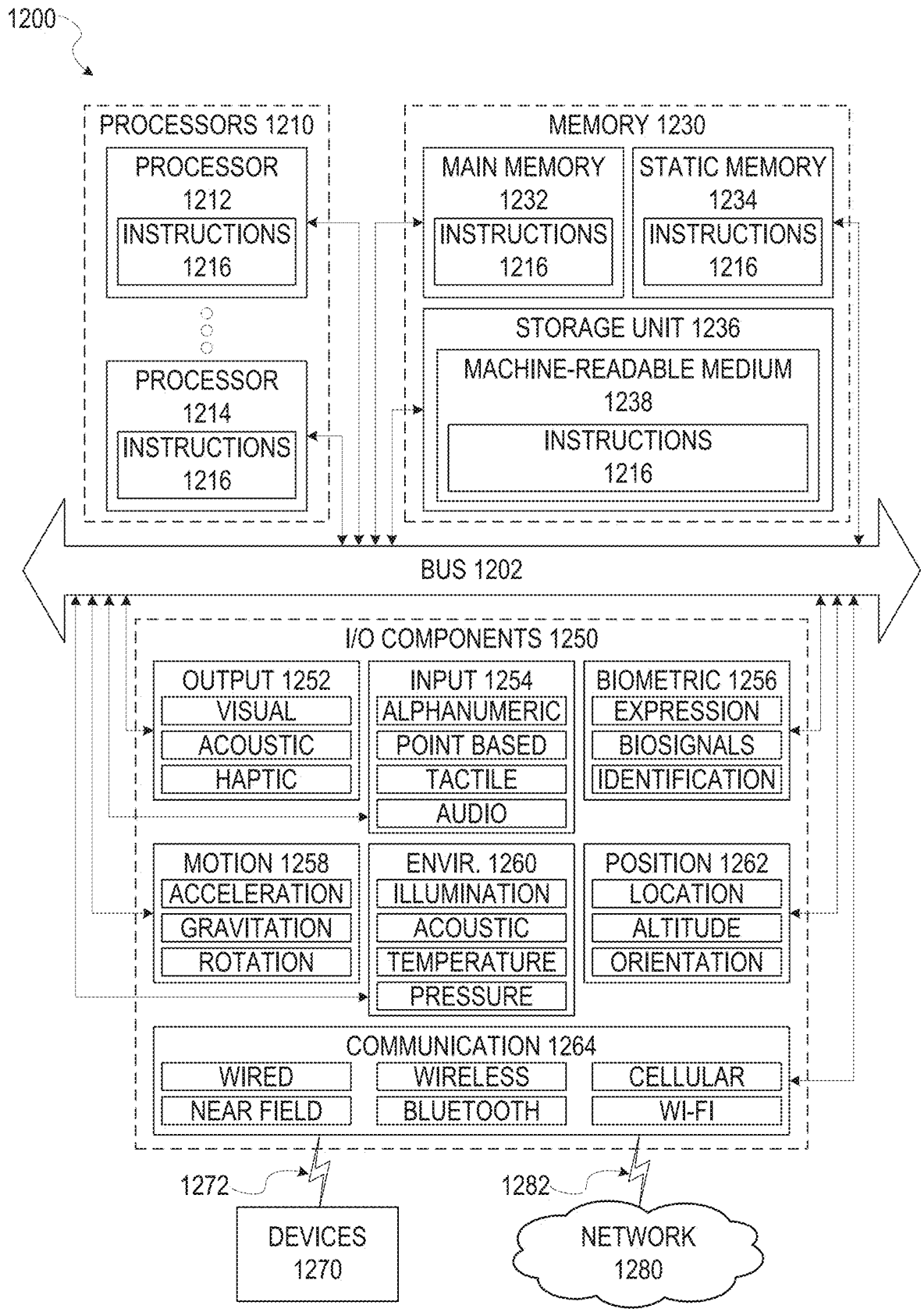
FIG. 12 illustrates a diagrammatic representation of a machine, in the form of a computer system, within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically. FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server system 108, 110, 112, 114, 116, 118, 122, 124, etc. or a client device 102 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1210, 1212 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the IO components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (RFID) tag reader components. NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium 1238 should be considered as being transportable from one physical location to another. Additionally, since the machine-readable medium 1238 is tangible, the medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing, at a first computing device associated with a first user, a first video stream;
   displaying, by the first computing device, the first video stream being captured by the first computing device;
   during display of the first video stream being captured by the first computing device, determining a subset of a plurality of computing devices that are within a predetermined distance from a location of the first computing device that are within a social network of the first user;
   selecting a second computing device, of the plurality of computing devices, that is associated with a second user with a closest relationship to the first user according to a social graph of the first user;
   causing display, by the first computing device, of a graphical indication that the second user is nearby while displaying the first video stream being captured by the first computing device;
   detecting, by the first computing device, a selection of the graphical indication that the second user is nearby, and in response to the selection of the graphical indication that the second user is nearby, causing display of further information about the second user, an option to send a message to the second user, and an option to view or capture a second video steam being captured on the second computing device;

detecting selection of the option to view the second video stream being captured on the second computing device;

in response to detecting selection of the option to view the second video stream being captures on the second computing device, sending, by the first computing device to the second computing device, a request to access the second video stream being captured on the second computing device;

receiving the second video stream being captured on the second computing device;

displaying, by the first computing device, the second video stream being captured on the second computing device, on a display of the first computing device in conjunction with display of the first video stream being captured by the first computing device;

capturing, by the first computing device, the displayed second video stream while continuing to capture the first video stream;

receiving input of text to augment a message comprising the first video stream and the second video stream;

generating an ephemeral message comprising the first video stream and the second video stream and the input text, the ephemeral message associated with a duration parameter indicating an amount of time that the ephemeral message will be displayed to a receiving user of the ephemeral message; and sending the ephemeral generated message to a third computing device wherein the ephemeral generated messages is removed from the third computing device after the amount of time indicated by the duration parameter associated with the ephemeral message.

2. The method of claim 1, wherein the first video stream and the second video stream are displayed at a same time in a split screen format.

3. The method of claim 1, wherein the generated message is displayed on the third device in a split screen format wherein the first video stream comprises a first part of the split screen and the second video stream comprises a second part of the split screen.

4. The method of claim 1, further comprising:
receiving a request to add at least one portion of the first video stream and at least one portion of the second video stream to a media collection; and
adding the at least one portion of the first video stream and the at least one portion of the second video stream to the media collection.

5. The method of claim 1, further comprising:
receiving a request to add the generated ephemeral message to a media collection; and
adding the generated ephemeral message to the media collection.

6. The method of claim 5, wherein the ephemeral message is removed from the media collection based on a determination that it has exceeded an associated media collection parameter associated with the ephemeral message.

7. The method of claim 1, wherein the display of the second video being captured on the second computing device in conjunction with display of the first video being captured by the first computing device, further comprises a user interface mechanism that allows for adjustment of a size of each of the first video and the second video for display on the first computing device.

8. The method of claim 1, further comprising:
detecting an orientation of the first computing device; and
automatically adjusting the display of the second video being captured on the second computing device in conjunction with display of the first video being captured by the first computing device based on the detected orientation of the first computing device.

9. The method of claim 1, wherein capture of the first video and the second video is performed using a higher quality format and display of the first video and the second video is performed using a lower quality format.

10. The method of claim 1, wherein selecting a second computing device, of the plurality of computing devices, is further based on the second computing device being closest in location to the location of the first computing device.

11. The method of claim 1, wherein the graphical indication is an icon indicating the relationship of the second user to the first user.

12. The method of claim 1, further comprising:
receiving input of a media overlay to augment the message comprising the first video stream and the second video stream; and
wherein generating the ephemeral message comprises generating the ephemeral message comprising the first video stream, the second video stream, the input text, and the input media overlay.

13. The method of claim 1, wherein the duration parameter is specified by the first user as a maximum amount of time that the ephemeral message is viewable by the receiving user before it is removed from the third computing device.

14. A computing device comprising:
a processor; and
a computer readable medium coupled with the processor, the computer readable medium comprising instructions stored thereon that are executable by the processor to cause the computing device to perform operations comprising:
capturing a first video stream, wherein the computing device is a first computing device associated with a first user;
displaying the first video stream being captured by the first computing device;
during display of the first video stream being captured by the first computing device, determining a subset of a plurality of computing devices that are within a predetermined distance from a location of the first computing device that are within a social network of the first user;
selecting a second computing device, of the plurality of computing devices, that is associated with a second user with a closest relationship to the first user according to a social graph of the first user;
causing display of a graphical indication that the second user is nearby while displaying the first video stream being captured by the first computing device;
detecting, a selection of the graphical indication that the second user is nearby, and in response to the selection of the graphical indication that the second user is nearby, causing display of further information about the second user, an option to send a message to the second user, and an option to view or capture a second video steam being captured on the second computing device;
detecting selection of the option to view the second video stream being captured on the second computing device;
in response to detecting selection of the option to view the second video stream being captures on the second computing device, sending, to the second computing device, a request to access the second video stream being captured on the second computing device;
receiving the second video stream being captured on the second computing device;

displaying the second video stream being captured on the second computing device, on a display of the first computing device in conjunction with display of the first video stream being captured by the first computing device;

capturing the displayed second video stream while continuing to capture the first video stream;

receiving input of text to augment a message comprising the first video stream and the second video stream;

generating an ephemeral message comprising the first video stream and the second video stream and the input text, the ephemeral message associated with a duration parameter indicating an amount of time that the ephemeral message will be displayed to a receiving user of the ephemeral message; and sending the ephemeral generated message to a third computing device wherein the ephemeral generated messages is removed from the third computing device after the amount of time indicated by the duration parameter associated with the ephemeral message.

15. The computing device of claim 14, wherein the first video stream and the second video stream are displayed at a same time in a split screen format.

16. The computing device of claim 14, wherein the message is displayed on the third device in a split screen format wherein the first video stream comprises a first part of the split screen and the second video stream comprises a second part of the split screen.

17. The computing device of claim 14, operations further comprising:
receiving a request to add at least one portion of the first video stream and at least one portion of the second video stream to a media collection; and
adding the at least one portion of the first video stream and the at least one portion of the second video stream to the media collection.

18. The computing device of claim 14, further comprising:
receiving a request to add the generated ephemeral message to a media collection; and
adding the generated ephemeral message to the media collection.

19. A non-transitory computer readable medium comprising instructions stored thereon that are executable by at least one processor to cause a computing device to perform operations comprising:
capturing a first video stream, wherein the computing device is a first computing device associated with a first user;
displaying the first video stream being captured by the first computing device;
during display of the first video stream being captured by the first computing device, determining a subset of a plurality of computing devices that are within g predetermined distance from a location of the first computing device that are within a social network of the first user;
selecting a second computing device, of the plurality of computing devices, that is associated with a second user with a closest relationship to the first user according to a social graph of the first user;
causing display of a graphical indication that the second user is nearby while displaying the first video stream being captured by the first computing device;
detecting, a selection of the graphical indication that the second user is nearby, and in response to the selection of the graphical indication that the second user is nearby, causing display of further information about the second user, an option to send a message to the second user, and an option to view or capture a second video steam being captured on the second computing device;
detecting selection of the option to view the second video stream being captured on the second computing device;
in response to detecting selection of the option to view the second video stream being captures on the second computing device, sending, to the second computing device, a request to access the second video stream being captured on the second computing device;

receiving the second video stream being captured on the second computing device;
displaying the second video stream being captured on the second computing device, on a display of the first computing device in conjunction with display of the first video stream being captured by the first computing device;
capturing the displayed second video stream while continuing to capture the first video stream;
receiving input of text to augment a message comprising the first video stream and the second video stream;
generating an ephemeral message comprising the first video stream and the second video stream and the input text, the ephemeral message associated with a duration parameter indicating an amount of time that the ephemeral message will be displayed to a receiving user of the ephemeral message; and
sending the ephemeral generated message to a third computing device wherein the ephemeral generated messages is removed from the third computing device after the amount of time indicated by the duration parameter associated with the ephemeral message.

20. The non-transitory computer readable medium of claim 19, the operations further comprising:
receiving a request to add the generated ephemeral message to a media collection; and
adding the generated ephemeral message to the media collection.

* * * * *

UNITED STATES PATENT AND TRADEMARK OFFICE
CERTIFICATE OF CORRECTION

PATENT NO. : 10,999,642 B1
APPLICATION NO. : 16/178301
DATED : May 4, 2021
INVENTOR(S) : Hollis et al.

Page 1 of 1

It is certified that error appears in the above-identified patent and that said Letters Patent is hereby corrected as shown below:

In the Claims

In Column 25, Line 29, in Claim 17, before "operations", insert --the--

In Column 25, Line 54, in Claim 19, delete "g" and insert --a-- therefor

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*